(No Model.)

C. L. COFFIN.
METHOD OF ELECTRIC WELDING.

No. 422,730.  Patented Mar. 4, 1890.

Witnesses
Cyrus L. Lathrop
Henry B. Lothrop

Inventor
Charles L. Coffin.

UNITED STATES PATENT OFFICE.

CHARLES L. COFFIN, OF DETROIT, MICHIGAN.

METHOD OF ELECTRIC WELDING.

SPECIFICATION forming part of Letters Patent No. 422,730, dated March 4, 1890.

Application filed November 19, 1889. Serial No. 330,827. (No model.)

*To all whom it may concern:*

Be it known that I, CHARLES L. COFFIN, of Detroit, in the county of Wayne and State of Michigan, have invented a new and useful Improvement in Methods of Electric Welding, of which the following is a specification.

My invention consists in a method of electric welding especially applicable to welding together the ends of hoops or similar articles by passing a heating-current through the joint, where the natural tendency of the current is to traverse the article itself instead of the joint.

The drawings illustrate mechanism by which my invention may be practiced.

Figure 2:
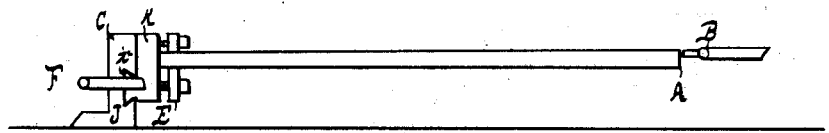
Figure 1:
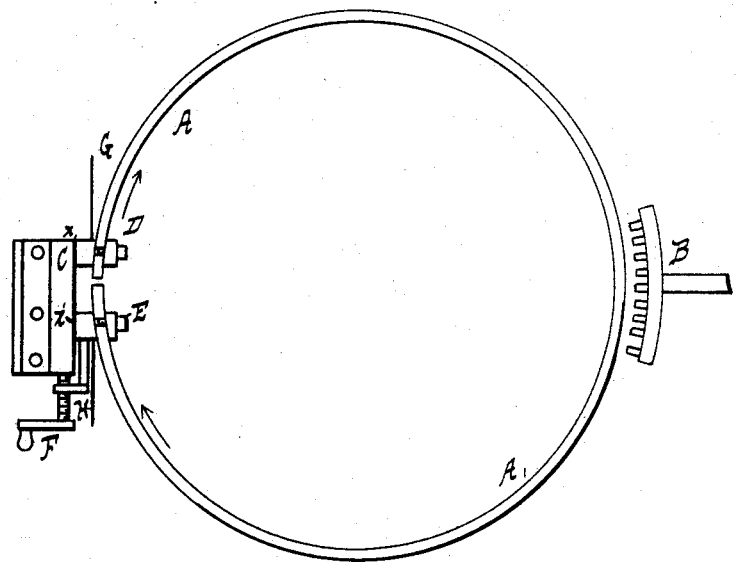

Figure 1 is a plan view, and Fig. 2 a side elevation.

C represents a block adapted to be secured to a suitable foundation, having rigidly fixed thereon a clamp D, and having a movable clamp E, sliding in a dovetail groove J in the block C, a screw-shaft F, threaded into said block C, and provided with a handle furnishing means for moving a movable clamp E. The clamps D and E are insulated from said block C by a strip of insulating material *i*.

G represents an electrical conductor, which connects the clamp D with one pole of a generator of electricity, and H represents an electrical conductor, which connects the clamp E with the other pole of said generator.

A represents a hoop held in the clamps D and E in position to weld together its two ends. When the ends of A are brought into contact and the current is turned on, if supposed to enter through conductor D, connecting with a positive pole of a generator, the resistance at the joint where the weld is to be made is usually greater than the resistance of the hoop itself, owing to imperfect contact at the joint, or the ends not being in contact when the heating is done by springing a voltaic arc between the ends. The current will therefore traverse the hoop A from clamp D to clamp E, as indicated by the arrows, unless some means be provided to render the resistance of the hoop greater than the resistance of the joint.

In an application which I have already filed, bearing date November 6, 1889, Serial No. 329,393, I have provided for doing this by magnetic influence. In this application I do the same thing by another means.

B represents a gas-jet adapted to throw a flame against hoop A at the joint in the continuous part of said hoop between clamps D and E. The object of this is to heat a portion of the hoop A, and thus to increase the resistance of that portion of said hoop until the resistance of the hoop itself becomes greater than the resistance at the joint, and the current, entering through conductor G, finds its easiest path across the joint instead of around through the hoop, in which condition of affairs the current will traverse the joint, and thereby raise the ends of the hoop to a welding heat, instead of being short-circuited around the hoop A. When the ends are brought to a welding-heat, the weld is made by forcing the ends together by means of the movable clamp E, and the weld may be then finished in any known way, as by rolling, hammering, &c.

What I claim as my invention, and desire to secure by Letters Patent, is—

The herein-described method of welding by electricity an article which furnishes a path for the current of less resistance than through the proposed joint, consisting in heating a portion of said article until its resistance becomes greater than that of the joint, traversing the joint by an electric current, and pressing the ends together to form the weld.

CHARLES L. COFFIN.

Witnesses:
 CYRUS E. LOTHROP,
 GERTRUDE ANDERSON.